United States Patent [19]
Tsuda et al.

[11] Patent Number: 4,731,862
[45] Date of Patent: * Mar. 15, 1988

[54] BINARIZING SYSTEM OF PICTURE IMAGE SIGNALS

[75] Inventors: Yukio Tsuda, Musashino; Fumio Owada, Hachioji, both of Japan

[73] Assignee: Kabushiki Kaisha Toshiba, Kawasaki, Japan

[*] Notice: The portion of the term of this patent subsequent to May 19, 2004 has been disclaimed.

[21] Appl. No.: 709,662

[22] Filed: Mar. 8, 1985

[30] Foreign Application Priority Data
Apr. 28, 1984 [JP] Japan .................................. 59-86332

[51] Int. Cl.$^4$ .............................................. G06K 9/38
[52] U.S. Cl. ..................................... 382/50; 358/282; 358/284; 382/53
[58] Field of Search ................ 328/135; 307/351, 356, 307/358; 358/282, 284, 283; 382/50, 53, 52

[56] References Cited
U.S. PATENT DOCUMENTS 3,106,699 10/1963 Kamentsky ............................ 382/27
4,430,748 2/1984 Tuhro et al. ........................... 382/50

FOREIGN PATENT DOCUMENTS 0160364 11/1985 European Pat. Off. ............ 358/284

OTHER PUBLICATIONS

Schroeder, E. N., "Threshold Detector", *IBM Technical Disclosure Bulletin*, vol. 24, No. 4, 9/81, pp. 1821-1824.

Primary Examiner—Leo H. Boudreau
Assistant Examiner—Jose L. Couso
Attorney, Agent, or Firm—Finnegan, Henderson, Farabow, Garrett & Dunner

[57] ABSTRACT

A system preprocesses analog picture image signals formed by scanning a manuscript prior to binarization into signals representing black or white according to a predetermined threshold value, compares a digital signal of a picture element to be corrected and of a signal of a picture element at least one main scanning line before the picture element to be corrected and positioned at the same position as the picture element to be corrected in an auxiliary scanning direction which is attenuated with each main scanning line or lines are compared. The one of these two signals having a larger level at a given time is used as a reference signal showing the nature of tone of the manuscript. When the level of digital picture image signal of the picture element to be corrected is closer to a black or white than the level of the reference signal, the level of the digital picture image signal is adjusted towards black or white. In other cases, the level of the digital picture image signals is maintained. By this operation, the nature of tone of the manuscript is emphasized and the accuracy of judgement in later binarizing the analog picture image signals is improved.

8 Claims, 16 Drawing Figures

BINARIZING SYSTEM OF PICTURE IMAGE SIGNALS

BACKGROUND OF THE INVENTION

In a facsimile apparatus, for example, analog picture image signals produced by scanning printed matter or a manuscript with a line sensor are binarized (converted into binary codes) according to a predetermined threshold value. The level of the image signal varies variously depending upon such factors as the tone and line size of the picture image, whether the line is vertical or horizontal, and the state of surrounding picture image, etc. If the level were simply binarized, however, it would be impossible to obtain reproduceable binarized picture image signals. For example, since a fine black line in a white background, a continuous pattern of fine white and black lines, and a white fine line in a black background have different signal levels, it has been impossible to obtain all of the information for these lines regardless of the settings of their threshold values.

For this reason, in the past, a correction circuit was provided before a binarizing circuit for correcting signal levels of picture image signals. However, as will be described later in detail with reference to the accompanying drawings, the prior art correction circuit can not efficiently correct specific image signals.

SUMMARY OF THE INVENTION

It is an object of this invention to provide a novel binarizing system of picture image signals capable of efficiently correcting specific picture image signals wherein the amount of variation in signal levels between closely adjacent picture elements is small thereby improving reproduceability.

According to this invention, there is provided a binarizing system of a picture image signal comprising quantizing means for sequentially quantizing analog picture image signals obtained by scanning a manuscript picture image in accordance with a picture image signal clock; memory means for temporarily storing the quantized signals for each main scanning line of the manuscript picture image; reading-out means for reading out the temporarily stored signals corresponding to the picture image signals outputted from the quantizing means; first calculating means for varying levels of the signals read out from the memory means toward a binarized first level direction at each main scanning line or lines; comparator means for comparing a first picture level of the picture image signals outputted from the quantizing means with a second signal level of the signals read out from the memory means; selecting means which, in response to the output of the comparator means, selects the output signal of the first calculating means when the first signal level is closer to a binarized first level than the second signal level, but selects an output picture image signal of the quantizing means when the first signal level is closer to a binarized second level than the second signal level; writing means for writing the selected signals into the memory means for updating the same; and second calculating means which, in accordance with a third signal level of the signals written into memory means and the first signal level of the picture image signal outputted from the quantizing means, calculates the first signal level for emphasizing the same toward the binarized first level when the first signal level is closer to the binarized first level than the third signal level, thereby binarizing the picture image signals outputted from the second calculating means.

More particularly according to this invention a picture image signal of a picture element at least one picture element before the picture element to be corrected in the direction of auxiliary scanning is subjected to an approximate integration to obtain a reference signal which is used to correct the picture image signal of the picture element to be corrected. As a consequence, even a picture image signal, the level thereof changes only a little and the level after change persists over a relatively long time can be efficiently corrected.

In addition the binarizing system of this invention can be fabricated with relatively simple hardware and various signals can be processed at high speeds.

DESCRIPTION OF THE PREFERRED EMBODIMENTS

Figure 1:
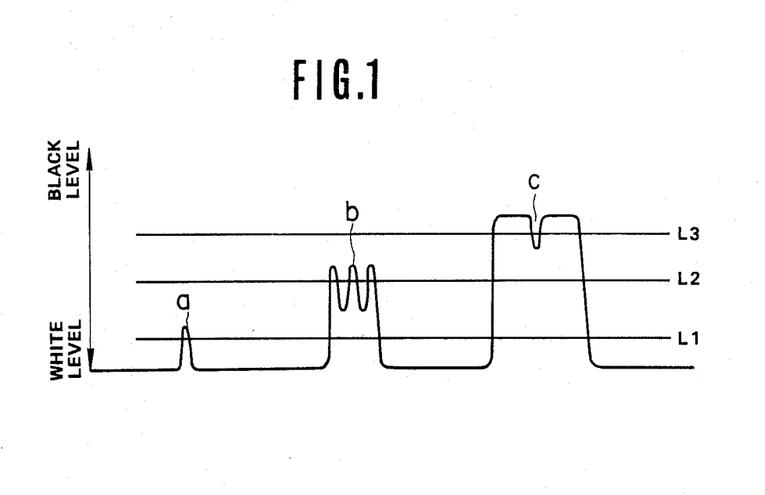
FIG. 1 shows one example of waveforms of picture image signals.
Figure 2:
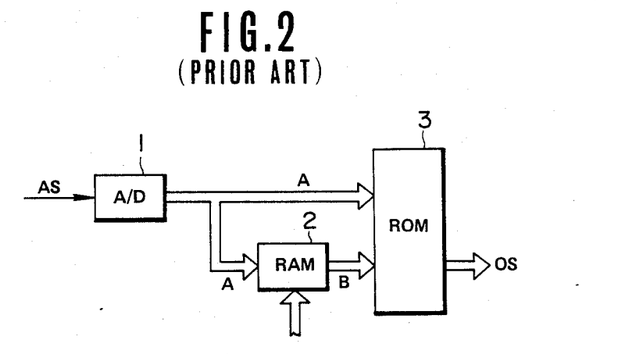
FIG. 2 is a block diagram showing one example of a prior art level correction circuit.

Before describing preferred embodiments of this invention, a prior art level correction circuit of a binarizing circuit will be described. Referring to FIG. 1, a fine black line a in a white background, a continuous pattern b of fine white and black lines and a fine white line c in a black background have different signal levels so that some of the information is lost with the result that all of the information about these signals can not be obtained regardless of settings of the threshold values to different levels $L_1$, $L_2$ and $L_3$. Accordingly, a level correction circuit as shown in FIG. 2 has been used. The circuit shown in FIG. 2 comprises an A/D converter 1 which converts an analog picture image signal AS obtained by a read unit, not shown, into a digital signal by sequentially quantizing picture elements partitioned in accordance with an image block, not shown, a RAM 2 for temporarily storing a digital picture image signal outputted from the A/D converter 1 for each line, and a ROM 3 receiving as an address a digital image signal A outputted from the A/D converter 1 (based on the picture image block) and a digital picture image signal B outputted from RAM 2 (corresponding to a digital picture image signal one line before). ROM 3 produces a correction digital picture image signal OS corresponding to the address.

Figure 3:
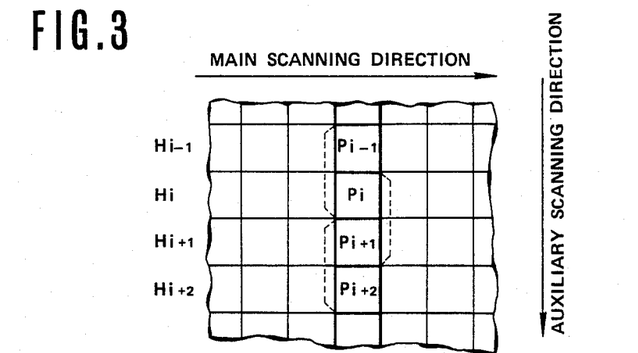
FIG. 3 is a schematic representation of a picture element array which is useful to explain the operation of the circuit shown in FIG. 2.

With this construction, when the A/D converter 1 inputs to ROM 3 a digital picture image of a picture image on a main scanning line Hi shown in FIG. 3, the RAM 2 would apply to ROM 3, a digital picture image signal of a picture element $P_{i-1}$ corresponding to the picture element $P_i$ on a main scanning line $H_{i-1}$ one line before the main scanning line $H_i$. In the same manner, while a digital picture image signal of a picture element $P_{i+1}$ on a main scanning line is being outputted from the A/D converter 1, the RAM 2 would produce a digital image signal of a picture element $P_i$ on a main scanning line $H_i$ one line before the main scanning line $H_{i-1}$. In this manner, digital signals of a picture element from the current line and a picture element of one line before are supplied to the ROM 3 as an address. The picture elements used as the address are adjoining in the direction of the auxiliary scanning which is perpendicular to the direction of the main scanning. The ROM 3 is prewritten with the result of calculation of the following equation corresponding to the address informations.

$$OS = 2A - B \quad (1)$$

Figure 4A:
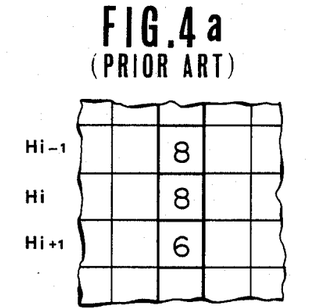
FIGS. 4a, 4b and FIGS. 5a, 5b are schematic representations showing level correction operations of the circuit shown in FIG. 2.

This equation is established for the purpose of emphasizing a digital image signal A of a given picture element (hereinafter termed a picture element to be corrected) in accordance with a digital picture image signal B of a picture element of one line before (hereinafter termed a reference picture element). For example, assume now that a digital picture image signal A of a picture element to be corrected $P_{i+1}$ on a main scanning line $H_{i+1}$ has a level of 6 as shown in FIG. 4a, the picture image signal B of a reference picture image $P_i$ has a level of 8, then after correction the picture element to be corrected $P_{i+1}$ will have a signal level OS expressed by $$OS = 2 \times 6 - 8 = 4$$

Figure 4B:
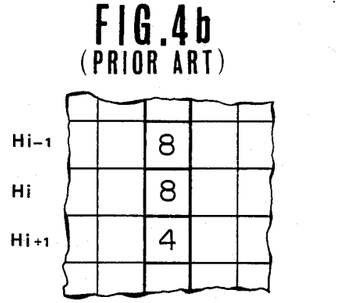

As the level value increases it approaches a black level, whereas when the level value decreases it approaches to a white level. Accordingly where the signal level of the picture element to be corrected is decreasing, the signal level of the picture element to be corrected is urged toward a white level by the calculation described above. FIG. 4b shows the variation in the level OS of the digital picture image signal after correction.

On the other hand, when the signal level of a picture element to be corrected increases, the signal level of the picture element to be corrected would be urged toward a black level. Where a picture element to be corrected and a reference picture element have the same continuous level, the signal level of the picture element to be corrected would be maintained at a constant value. As described above, where the correction circuit shown in FIG. 2 is used it is possible to adjust the variation in the picture image signal. As a consequence, it is possible to binarize a picture image signal with a high fidelity with respect to the manuscript picture image.

Figure 5A:
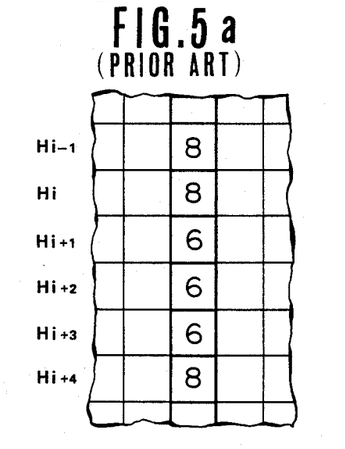
Figure 5B:
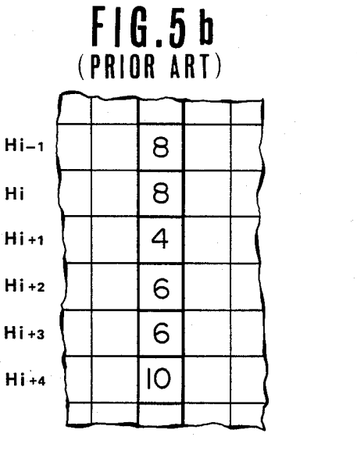

In such a prior art correction circuit, however, the correction is made by considering only the signal level of a reference picture element, and consequently there are the following defects. More particularly, as shown in FIG. 5a, if the picture image signal level of picture elements on a continuous main scanning line and having the same number of bits has varied from 8 to 6 in the direction of the auxiliary scanning and if this level 6 is maintained, the signal level of a picture element $P_{i+1}$ on a main scanning line $H_{i+1}$ is corrected as above described. As can be clearly noted from equation (1) the signal levels of the picture elements $P_{i+2}$ and $P_{i+3}$ on the main scanning lines $H_{i+2}$ and $H_{i+3}$ would be maintained at a level of 6. In this case, the digital image signal OS after correction is shown by FIG. 5b. For this reason, where the level of a binarized signal is set to 5 among the digital image signals OS, after correction only a picture element $P_{i+1}$ on a main scanning line $H_{i+1}$ would be detected as a white picture element. The picture elements $P_{i+2}$ and $P_{i+3}$ which would have been the white picture elements on the main scanning lines $H_{i+2}$ and $H_{i+3}$ are detected as black picture elements.

For this reason, effective correction is impossible for picture image signals wherein the variation of the signal levels of the picture elements in the direction of the auxiliary scanning is small and wherein the levels of these picture elements after correction are maintained over a relatively long period (more than a plurality of picture elements) in the direction of the auxiliary scanning. It is therefore impossible to binarize with a high reproduceability a manuscript picture image in which the variation in the picture image signal level is slow.

As described below the invention contemplates elimination of these defects.

Figure 6:
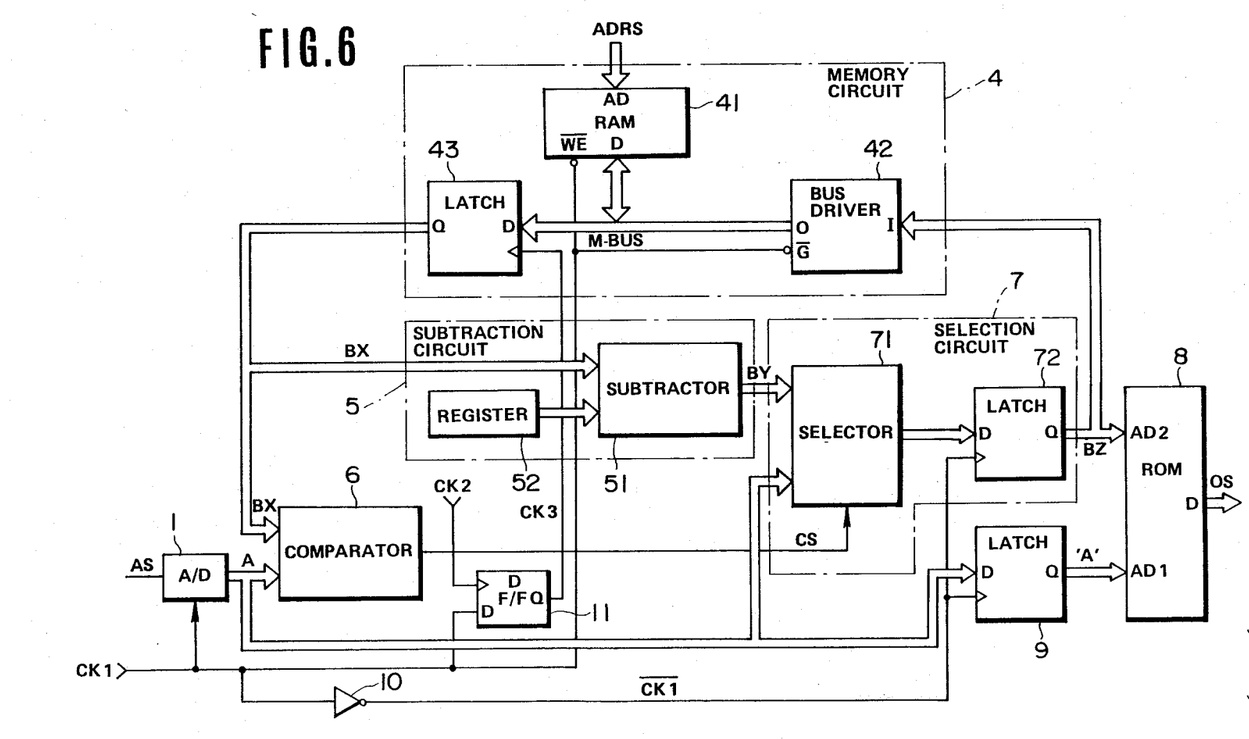
FIG. 6 is a block diagram showing one embodiment of the level correction circuit for use in the binarizing circuit according to this invention.

An improved correction circuit embodying the invention will now be described with reference to FIG. 6. The correction circuit shown in FIG. 6 is constituted by an analog/digital (A/D) converter 1 which converts an analog picture image signal AS into a digital signal A after quantizing the analog picture image signal AS, a memory circuit 4 storing a selection signal utilized in a selection circuit 7 to be described later, a subtraction circuit 5 which subtracts a definite quantity N (N is an integer) from an output signal BX of the memory circuit 4 at each predetermined number M (M is an integer) of the main scanning lines, a comparator 6 for comparing the level of an output signal BX of the memory circuit 4 with the level of a digital picture image signal A outputted from the A/D converter 1, a selection circuit 7 which selects either one of the outputs of the subtracting circuit 5 and the A/D converter 1 based on the output of the comparator 6, and a ROM 8 for correcting by calculation the output of the A/D converter 1, that is the digital picture image signal A of a picture element to be corrected.

Figure 7:
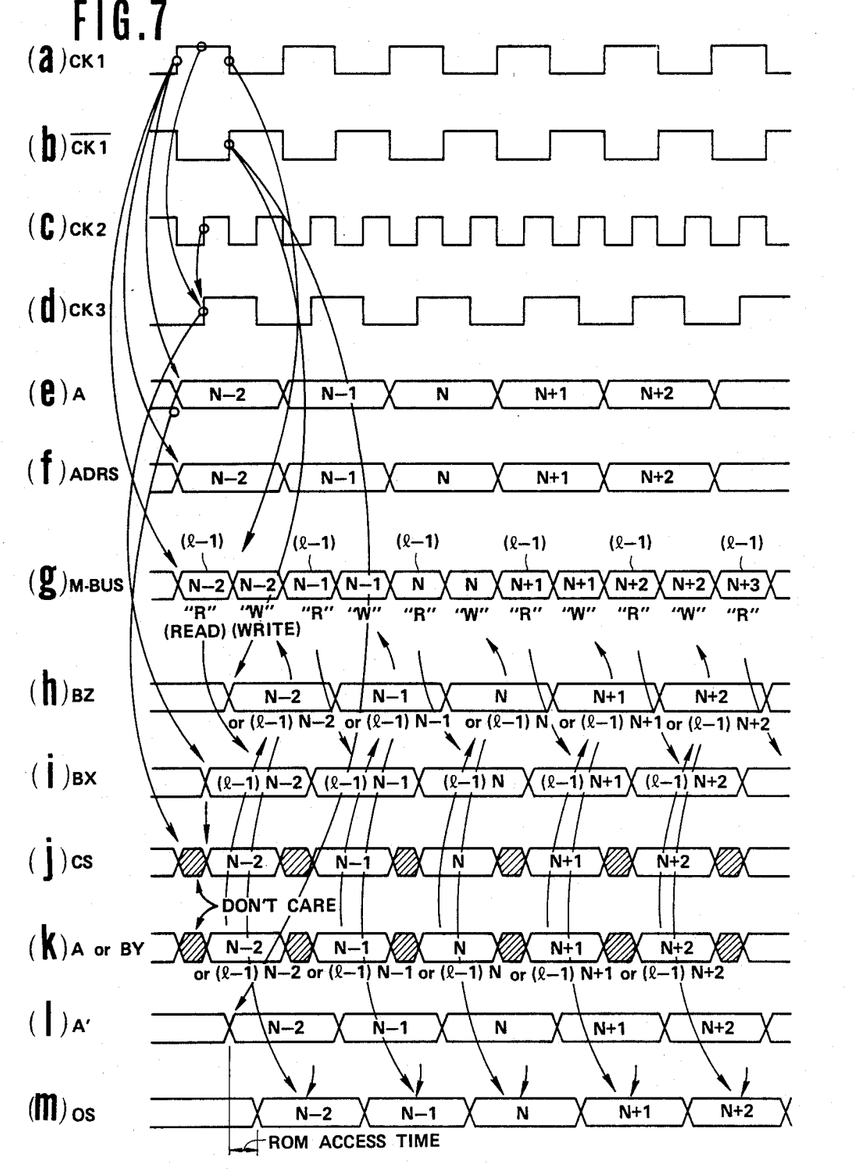
FIG. 7 is a timing chart showing one example of operation of the correction circuit shown in FIG. 6.

The performances of these circuit elements will be described with reference to a timing chart shown in FIG. 7. In FIGS. 6 and 7 clock CK1 is a picture image clock, clock $\overline{CK1}$ is a clock obtained by inverting clock CK1, and clock CK3 is a clock obtained by sequentially latching the picture image clock CK1 at the building up time of the clock CK2 (see FIG. 7c) having a period of one half of the picture image clock CK1. In FIG. 7, N designates a Nth picture element on a given main scanning line or the contents of various signals corresponding to the picture elements. In the same manner, (N−1) designates a picture element one picture element before the Nth picture element or the contents of various signals corresponding thereto. In the same manner, (N+1) designates a picture element just after the Nth picture element on the same main scanning line or contents of various signals corresponding thereto. Further, (l−1) shown in FIGS. 7g and 7i designates a main scanning line one line before a given main scanning line. Consequently (l−1)N, for example, designates the Nth picture element on a main scanning line one line before the given main scanning line or the contents of various signals corresponding thereto.

The memory circuit 4 functions as a line memory device which writes or reads data into and out of respective picture element addresses of one line through a data bus line M-BUS according to addresses designated by an address signal ADRS applied from an address counter or the like, not shown. The memory circuit 4 is constituted by a bus driver 42 controlling the data on the data bus line M-BUS and a latch circuit 43 which latches the data read out from RAM 41. A digital signal selected by the selection circuit 7 is written into the RAM 41 via the bus driver 42 and the data bus line M-BUS A signal BX read out from RAM 41 through the data bus line is applied to the subtraction circuit 5 and comparator 6 via the latch circuit 43. The bus driver 42 is constructed such that it transmits its input data to the data bus line M-BUS only when the picture image clock CK1 applied to a gate terminal $\overline{G}$ of the bus driver 42 is at a low logic level. Also, the RAM 41 can be written with data transmitted to the data bus line M-BUS only when the picture image clock CK1 applied to the write enable terminal $\overline{WE}$ of the RAM 41 is at the low logic level.

In other cases, when the logic level of the picture image clock CK1 is at a high logic level, data can be read out. The latch circuit 43 is constructed such that it latches the data read out from the RAM 41 at the time of building up of the clock CK3 supplied from the D type flip-flop circuit 11. The content of the data bus line M-BUS and the content of the signal latched by the latch circuit 43 will become as shown by FIG. 7g and FIG. 7i corresponding to the clocks CK1 and CK3 (see FIG. 7a and FIG. 7d) and the address designation by the address signal ADRS (see FIG. 7f).

The subtraction circuit 5 is made up of a subtractor 51 and a register 52 in which a value to be subtracted by the subtractor 51 is set, and operates to sequentially subtract a definite value preset in the register 52 from the output signal BX of the memory circuit 4. A signal obtained after subtraction is designated by BY.

As described above, the comparator 6 compares the digital picture image signal outputted from the A/D converter 1 with the signal BX outputted from the memory circuit 4 for producing a signal CS representing a content corresponding to the relative level of signals A and BX. As shown in FIGS. 7e and 7i, signals A and BX are not in perfect synchronism, so that the output CS of the comparator 6 contains "Don't Care" regions shaded as shown in FIG. 7j.

The selection circuit 7 comprises a selector 71 and a latch circuit 72. The selector 71 selects either one of the output BY of the subtractor 51 and signal A outputted by the A/D converter 1 in accordance with the content of the output signal CS of the comparator 6 (see FIG. 7k). The selected signal is latched by the latch circuit 72 and then supplied to the memory circuit 4 and ROM 8. In this embodiment, the selector 71 selects the digital picture image signal A outputted from the A/D converter 1 when the content of the signal CS outputted from the comparator shows that signal A≧signal BX. Selector 71 also selects the output signal BY outputted from the subtraction circuit 5 when the contents of the signal CS shows that signal A<signal BX. The selected signal is designated by BZ (see FIG. 7h).

ROM 8 is supplied with an address formed by the signal BZ latched by the latch cicuit 72 and a signal A' (see FIG. 7l) outputted from the A/D converter 1 and latched by the latch circuit 9. This occurs at the time of building up of clock CK1 (see FIG. 7l). Among correction digital image signals OS previously written into a region designated by this address, correction digital picture image signals OS corresponding to the received address are read out.

The correction digital picture image signals OS are set by the following calculations. As the values showing the levels of the picture image signals increase, the level approaches the black level and as those values decrease, the level approaches the white level. Then, when the picture image signal A', outputted from the A/D converter 1 and latched by the latch circuit 9, and when the signal BZ (hereinafter termed a reference signal) outputted from selector 7 and latched by latch circuit 72, have a relation:

$$A' \geqq BZ \qquad (2)$$

OS becomes $$OS = A' (= A) \qquad (3)$$

whereas when $$A' > BZ \qquad (4)$$

OS becomes $$OS = 2A' - BZ(=2A - BZ) \qquad (5)$$

The following Table 1 shows one example of the corrected picture image signals OS calculated by these equations and expressed in multiple values.

TABLE 1

| | | A' (= A) | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| Bz | 0 | 0 | 1 | 2 | 3 | 4 | 5 | 6 | 7 | 8 | 9 | 10 | 11 | 12 | 13 | 14 | 15 |
| | 1 | 0 | 1 | 2 | 3 | 4 | 5 | 6 | 7 | 8 | 9 | 10 | 11 | 12 | 13 | 14 | 15 |
| | 2 | 0 | 0 | 2 | 3 | 4 | 5 | 6 | 7 | 8 | 9 | 10 | 11 | 12 | 13 | 14 | 15 |
| | 3 | 0 | 0 | 1 | 3 | 4 | 5 | 6 | 7 | 8 | 9 | 10 | 11 | 12 | 13 | 14 | 15 |
| | 4 | 0 | 0 | 0 | 2 | 4 | 5 | 6 | 7 | 8 | 9 | 10 | 11 | 12 | 13 | 14 | 15 |
| | 5 | 0 | 0 | 0 | 1 | 3 | 5 | 6 | 7 | 8 | 9 | 10 | 11 | 12 | 13 | 14 | 15 |
| | 6 | 0 | 0 | 0 | 0 | 2 | 4 | 6 | 7 | 8 | 9 | 10 | 11 | 12 | 13 | 14 | 15 |
| | 7 | 0 | 0 | 0 | 0 | 1 | 3 | 5 | 7 | 8 | 9 | 10 | 11 | 12 | 13 | 14 | 15 |
| | 8 | 0 | 0 | 0 | 0 | 0 | 2 | 4 | 6 | 8 | 9 | 10 | 11 | 12 | 13 | 14 | 15 |

TABLE 1-continued

| | A' (= A) | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 9 | 0 | 0 | 0 | 0 | 1 | 3 | 5 | 7 | 9 | 10 | 11 | 12 | 13 | 14 | 15 | |
| 10 | 0 | 0 | 0 | 0 | 0 | 2 | 4 | 6 | 8 | 10 | 11 | 12 | 13 | 14 | 15 | |
| 11 | 0 | 0 | 0 | 0 | 0 | 1 | 3 | 5 | 7 | 9 | 11 | 12 | 13 | 14 | 15 | |
| 12 | 0 | 0 | 0 | 0 | 0 | 0 | 2 | 4 | 6 | 8 | 10 | 12 | 13 | 14 | 15 | |
| 13 | 0 | 0 | 0 | 0 | 0 | 0 | 1 | 3 | 5 | 7 | 9 | 11 | 13 | 14 | 15 | |
| 14 | 0 | 0 | 0 | 0 | 0 | 0 | 0 | 2 | 4 | 6 | 8 | 10 | 12 | 14 | 15 | |
| 15 | 0 | 0 | 0 | 0 | 0 | 0 | 0 | 1 | 3 | 5 | 7 | 9 | 11 | 13 | 15 | |

A method of binarizing with the correction circuit described above will now be described. In the following description picture element rows $P_1, P_2, P_3, \ldots, P_9$ in the direction of the auxiliary scanning as shown in FIG. 8 are corrected by noting any picture element position on the main scanning line.

Figure 8:
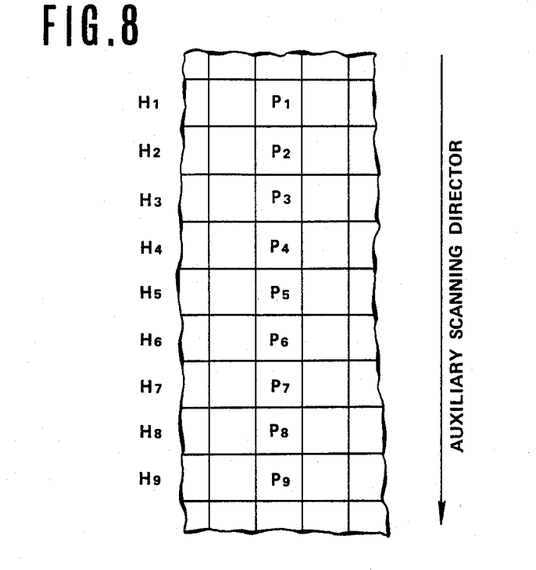
FIG. 8 is a diagrammatic representation of a picture element array to be corrected.
Figure 9:
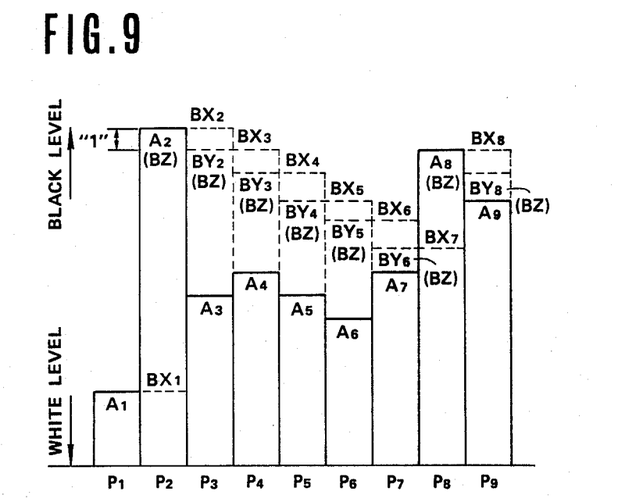
FIG. 9 is a graph showing one example of the relationship among levels of an output signal from an A/D converter shown in FIG. 6, a signal read out from a RAM, and a reference signal used for correction.

At first, it is assumed that corrections of the digital picture image signals of the picture images on the main scanning line $H_1$ shown in FIG. 8 have been completed and that the digital picture image signal $A_1$ of the picture image $P_1$ at the position of a picture element to be corrected has already been stored. Under this state, when a digital picture image signal $A_2$ of a picture element $P_2$ to be corrected on the next main scanning line $H_2$ is outputted from the A/D converter 1, several things happen. First, $A_1$ of a picture element is read out from the memory circuit 4 as a signal $BX_1$ according to the timings shown in FIGS. 7g and 7i and the signal $BX_1$ thus read out. Second, a signal $A_2$ is outputted from the A/D converter 1, and then $A_1$ and $A_2$ are compared with each other by comparator 6 (see FIGS. 7e, 7i and 7j). Where the result of comparison is such that when the signal $A_2$ is larger than the signal $BX_1$ as shown in FIG. 9, in accordance with the output signal CS of the comparator 6, a digital picture image signal $A_2$ outputted from the A/D converter 1 is selected by selector 71. The selected signal is applied to ROM 8 as a reference signal BZ together with signal A' outputted from the A/D converter 1 and latched by the latch circuit 9 for addressing the ROM 8 (see FIGS. 7k and 7i). Thus, the ROM 8 is supplied with two digital signals havign the same level (see FIGS. 7k and 7l). As a result, the ROM 8 outputs a corrected digital picture image signal OS $(=A_2)$ calculated by equation (3) (see FIG. 7m). The signal BZ $(=A_2)$ selected by the selector 71 is supplied to RAM 41 through the bus driver 42 and written therein for substituting signal A which has been stored in RAM 41 (see FIGS. 7h and 7g). Then, when a digital picture image signal of the picture element $P_3$ on the main scanning line $H_3$ is outputted from the A/D converter 1, in the same manner as above described, the digital picture image signal $A_2$ is read out from the memory circuit 4 as a signal $BX_2$. The read out signal $BX_2$ is compared with a signal $A_3$ by the comparator 6. As shown in FIG. 9, when the signal $A_3$ is smaller than the signal $BX_2$ $(=A_2)$ read out from RAM 41, the selector 71 selects the output signal of the subtraction circuit 5. The signal $BY_2$ outputted from the subtraction circuit 5 corresponds to a signal obtained by subtracting 1 from the output signal $BX_2$ of the memory circuit 4, where $BY_2=BX_2-1$. The subtracted signal $BY_2$ thus selected is applied to ROM 8 as the reference signal BZ.

As shown by FIG. 9, the level of the subtracted signal $BY_2$ is larger than that of signal $A_3$, even after the subtraction (see equation (4)) whereby addresses are designated by these signals $BY_2$ and $A_3$. Consequently, ROM 8 outputs a correction digital picture image signal OS according to the following equation (5).

$$OS=2A_2-BY_2 \tag{5}$$

This signal OS always has a value smaller than signal $A_3$ outputted from the A/D converter 1. The output signal $A_2$ of the A/D converter 1 is emphasized toward the white level. Concurrently with this level correction, the output signal BZ from the selector 71, that is $BY_2$ $(=BX_2-1)$ is applied to RAM 41 via the bus driver 42 for substituting signal $A_2$ which has been stored therein.

Then, let us assume that the digital picture image signal $A_4$ of a picture element $P_4$ to be corrected is outputted from the A/D converter 1 and that, as shown in FIG. 9, the level of this signal is slightly larger than that of the signal $A_3$ previously outputted from the A/D convert 1 but smaller than the level of signal $BY_2$ outputted from the memory circuit 4 as a signal $BX_3$ at this time. Consequently, in this case too, the selector 71 outputs a signal $BY_3$ $(=BX_3-1)$ subtracted by the subtraction circuit 5 as the reference signal B2. Simultaneously, ROM 8 addressed by the signal $A_4$ and the subtracted signal $BY_3$ having a larger level than this signal $A_4$ (at this time equation (4) holds) outputs a corrected digital image signal OS calculated by equation (5).

$$OS=2A_4-BY_3$$

Thus, in this case too, the white level is emphasized.

In the example shown in FIG. 9, in the same manner as above described, the correction values of the digital picture image signals $A_5$–$A_7$ of the succeeding picture elements $P_5$–$P_7$ to be corrected are determined by signals $BY_4$–$BY_6$ having levels obtained by respectively subtracting 1 from stored signals $BY_2$–$BY_5$ regarding the previous scanning line. Accordingly, these digital picture image signals are emphasized toward the white level. In the example shown in FIG. 9, the relations among the levels of the digital picture image signal A of the picture image to be corrected, the reference signal BZ and the corrected digital picture image signal OS are shown in the following Table II.

TABLE II

| | A | BZ | OS |
|---|---|---|---|
| $P_1$ | $A_1 = 3$ | — | — |
| $P_2$ | $A_2$  14 | $A_2 = 14$ | 14 |
| $P_3$ | $A_3 = 7$ | $BY_2 = 13$ | 1 |
| $P_4$ | $A_4 = 8$ | $BY_3 = 12$ | 4 |
| $P_5$ | $A_5 = 7$ | $BY_4 = 11$ | 3 |
| $P_6$ | $A_6 = 6$ | $BY_5 = 10$ | 2 |
| $P_7$ | $A_7 = 8$ | $BY_6 = 9$ | 7 |
| $P_8$ | $A_8 = 13$ | $A_8 = 13$ | 13 |
| $P_9$ | $A_9 = 11$ | $BY_8 = 12$ | 10 |

As above described, in the level correction circuit of this invention shown in FIG. 6, the signal level, as it is, of the reference picture element (a picture element at the same position on one main scanning line before) as a reference signal for correcting the picture image signal level of a picture element to be corrected is not used. Instead, a signal subjected to an integration processing approximating the signal level of the reference picture element or a reference picture element prior being used as the reference signal at any time. This can be noted from the progress of the reference signal BZ shown in FIG. 9, even when a plurality of picture elements having white levels continuously appear in a black picture image, all of these white picture elements are corrected for emphasizing white.

Figure 10:
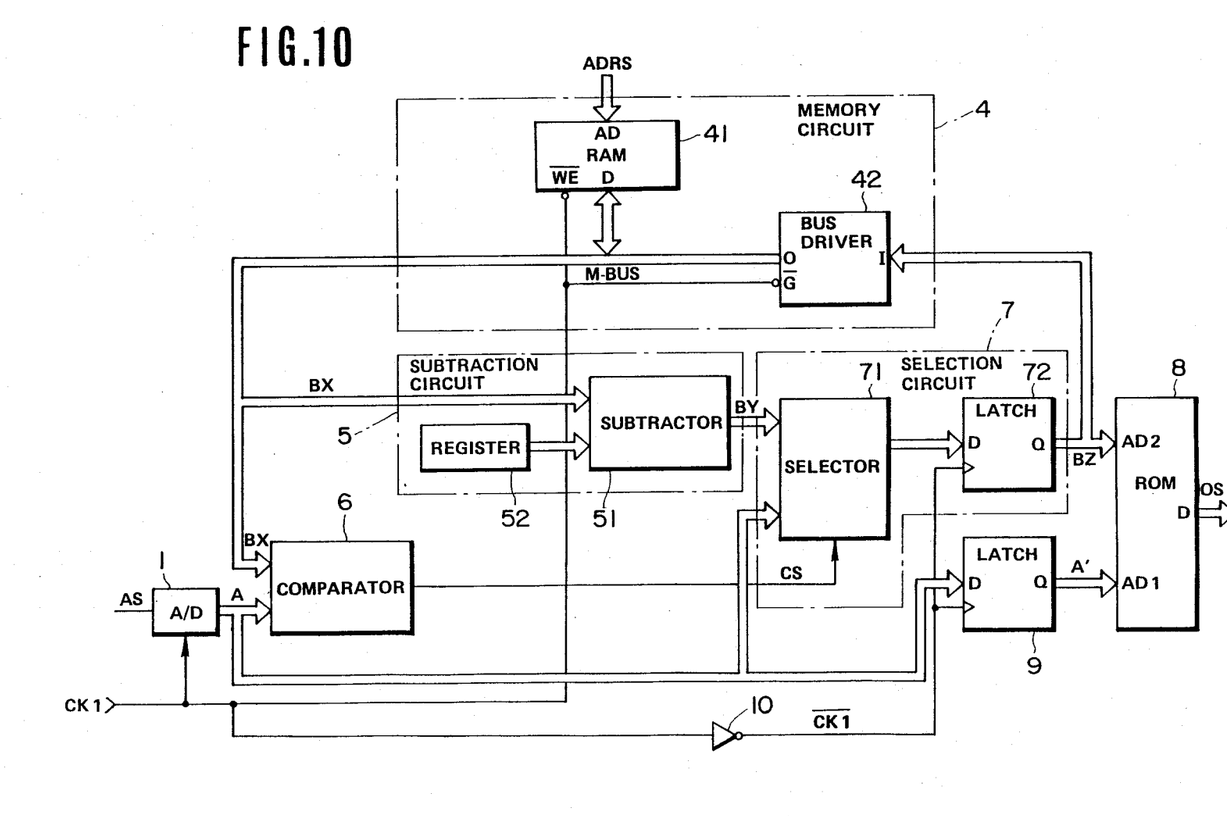
FIG. 10 is a block diagram showing another embodiment of the level correction circuit of this invention.
Figure 11:
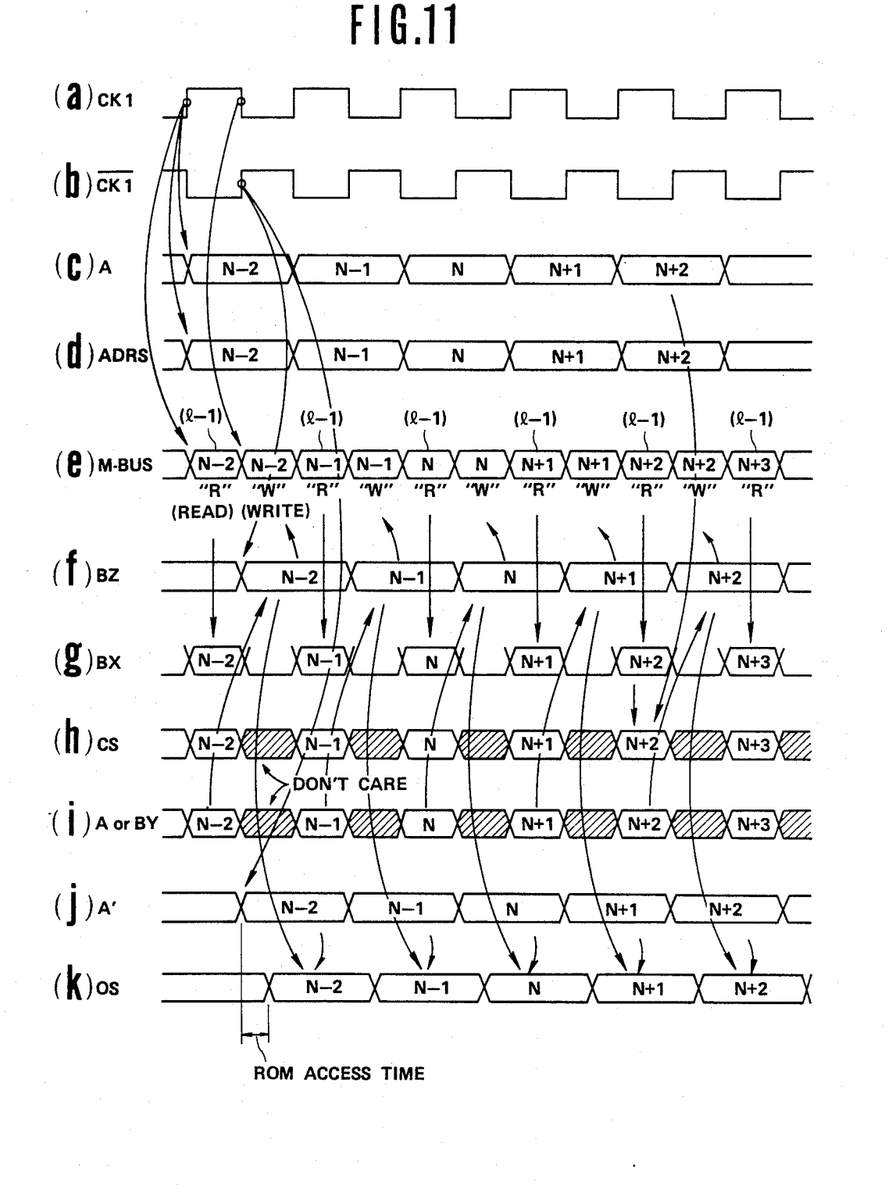
FIG. 11 is a timing chart showing one example of the operation of the level correction circuit shown in FIG. 10.

FIG. 10 shows a modified level correction circuit embodying the invention. This circuit is intended to perform the same level correction as the foregoing embodiment by eliminating the latch circuit 43 and the D type flip-flop circuit 11 from FIG. 6 and by using only the picture image clock CK1 and its inverted clock $\overline{CK1}$. FIG. 11 shows a timing chart showing the performances of respective blocks shown in FIG. 10, that is the waveforms of signals ourputted from these blocks, the waveforms being depicted corresponding to those shown in FIG. 7.

As can be noted from FIG. 11, even when a signal BX (see FIGS. 11e and 11g) read out from RAM 41 is directly compared with a signal A (see FIG. 11c) outputted from the A/D converter 1 with comparator 6, sufficiently reliable output signal CS can be obtained (see FIGS. 11c, 11g and 11h). For this reason, the correction circuit shown in FIG. 9 enables level correction as shown in FIG. 9 and Table II with simpler circuit construction. Since the overall operation of this circuit is substantially the same as that of the circuit shown in FIG. 6, its description will not be made again.

Figure 12:
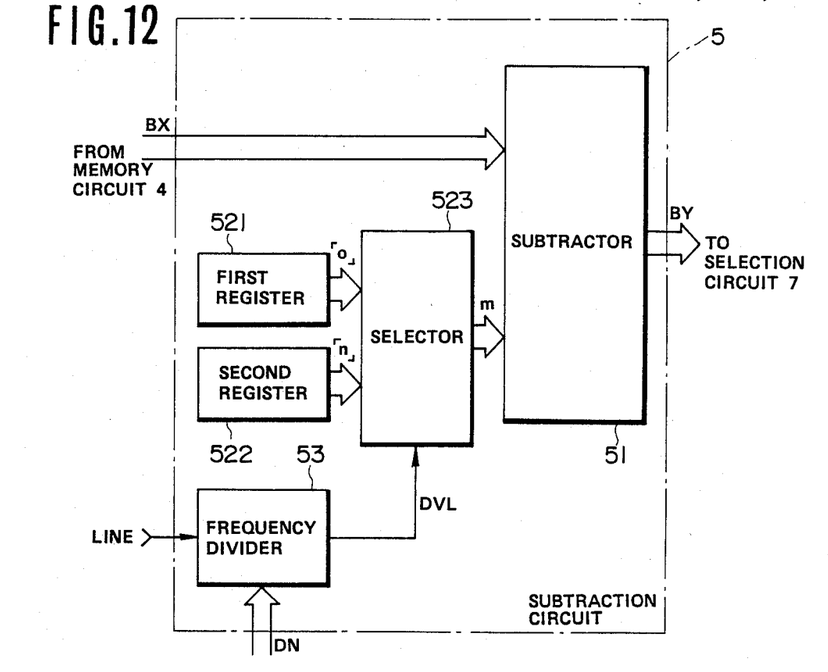
FIG. 12 is a block diagram showing the construction of the subtraction circuit adapted for use in a level correction circuit of a modified embodiment of the binarizing circuit according to this invention.

FIG. 12 shows still another embodiment of the correction circuit embodying the invention. This circuit is identical to that shown in FIG. 6 or FIG. 10 except the subtraction circuit 5 so that FIG. 12 shows the construction of only the subtraction circuit 5.

More particularly, the subtraction circuit 5 shown in FIG. 6 or FIG. 10 was constructed to subtract a predetermined value n (in the preceding embodiments, n=1) from the output signal BX of the memory circuit 4 at each main scanning line. However, the subtraction circuit 5 shown in FIG. 12, in addition to the subtractor 51, comprises a first register 521, in which 0 is set as a predetermined value to be subtracted, a second register 522 set with n (n is an integer other than 0), a frequency divider 53 that divides the frequency of a line start signal LINE generated at each main scanning line in accordance with a frequency division number designation data DN supplied from outside, and a selector 523 which selects values 0 or n outputted from the first and second registers 521 and 522 in accordance with the frequency division signal DVL outputted from the frequency divider 53 for applying a selected value m to the subtractor 51. The subtraction operation described above is executed at each one of a plurality of main scanning lines of the number corresponding to the number of frequency divisions of the frequency divider 53.

As an example of the operation of this subtraction circuit 5, the operation of a case wherein the number of frequency division is 3, that is, the predetermined value n is subtracted at every 3 main scanning lines, will be described as follows with reference to the timing chart shown in FIG. 13.

Figure 13:
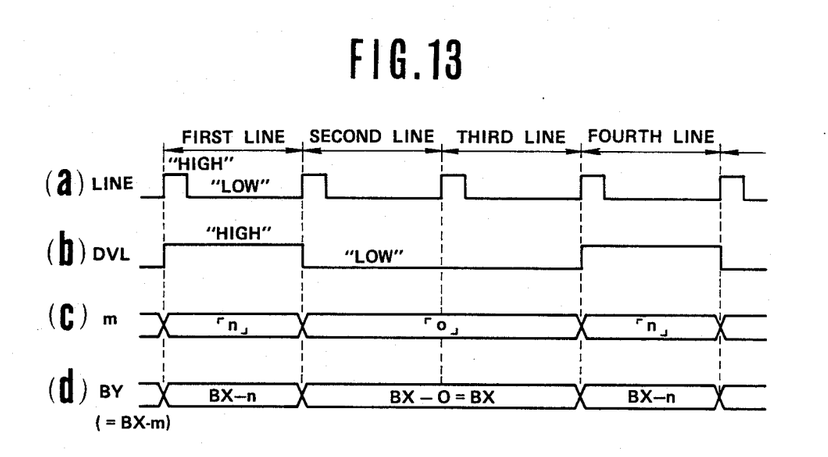
FIG. 13 is a timing chart showing one example of the operation of the circuit shown in FIG. 12.

Suppose now that the line start signal LINE is applied to the frequency divider 53 as shown in FIG. 13a and corresponding to the read scanning of a manuscript with a line sensor or the like described above and that the frequency divider 53 is applied with a number of frequency division designation data DN representing the number of frequency divisions 3. In this case, frequency divider 53 outputs a frequency division signal DVL whose logic level becomes high (H) during one line at each three scanning lines as shown in FIG. 13b. When the logic level of the frequency division signal DVL is at the low (L) level, the selector 523 selects the output 0 from the first register 521, whereas when the logic level of the signal DVL is at the H level, the selector 523 selects the output n of the second register 522. Then, the selector 523 outputs a selected value m which becomes n during one scanning line but becomes 0 in other cases at each three scanning lines corresponding to the variation of the frequency division signal DVL. In the same manner, subtractor 51 executes a subtraction operatio of $BY=BX-n$ during one scanning line at each 3 scanning lines corresponding to the variation in the frequency division signal DVL. In other cases, the subtractor 51 sends a signal BY=BX to the selection circuit 7 (see FIG. 13d).

Figure 14:
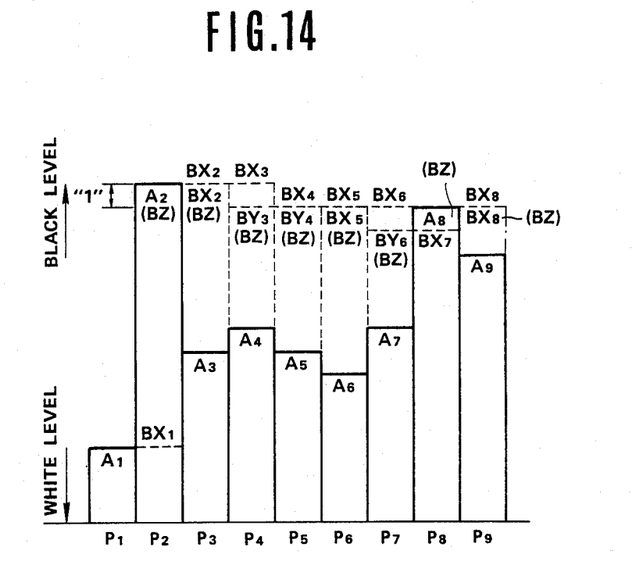
FIG. 14 is a graph showing one example of the relationship of the output signal BX, the subtracted signal BY, and the reference signal BZ for different picture elements in the circuit shown in FIG. 12.

As described above in the modification shown in FIG. 12, when the number of frequency divisions is 3, the predetermined number n is 1, and when the output signal of the A/D converter 1 (not shown in FIG. 12), that is, the digital picture image signal A of a picture element to be corrected varies in a manner as shown in FIG. 9. Then, with the modified correction circuit shown in FIG. 12, the output signal BX of the memory circuit 4, the subtracted signal BY and the reference signal BZ would vary in a manner as shown in FIG. 14 in which the picture element $P_1$ corresponds to the picture element to be corrected on the first line in the timing chart shown in FIG. 13.

According to this modification, it is possible to make the degree of attenuation of the reference signal BZ smoother than that of the previous embodiments when a plurality of picture elements of white levels are continuously present in a black picture image, and more efficient correction can be made then the previous embodiments.

The subtraction processing of the subtraction circuit 5 may be done at each plurality of scanning lines as in the embodiment shown in FIG. 12 or at each scanning line as in the foregoing embodiments, so that, in practice, a preferred circuit determined by experience can be used.

The value subtracted by the subtraction circuit is not limited to 1 but may be any value which is preferable for practical use.

Although in the foregoing embodiments, a reference signal BZ is subjected to an approximate integration processing by using the subtraction circuit 5, other circuits such as an adder, a multiplier, a divider can also be used so long as the other circuits can attenuate with time the level of the reference signal but utilizing the scanning time of a main scanning line as a unit time. In the above embodiment, the adder manufactured by Texas Instruments (SN7418283) is employed as the subtraction circuit 51. In the foregoing embodiments, by using as a reference a high binary black level, only the low level signals were emphasized toward the binary white level. If the direction of emphasis of the signal level of a picture element to be corrected is opposite, the level variation with time applied to the reference signal BZ would also be reversed.

It should be understood that the invention is not limited to the specific embodiments described above and that the construction of the correction circuit, calculating equations for calculating correction values, etc., can be modified without departing from the scope of this invention as defined in the appended claims.

What is claimed is:

1. A system for preprocessing an analog picture image signal representing a characteristic of a picture image obtained by scanning a document along successive main scanning lines, said system comprising:

quantizing means for sequentially quantizing said analog picture image signals to form a first number of picture element signals for each of the main scanning lines, each of the picture element signals representing a different position of said picture image along one of the main scanning lines;

a line memory for temporarily storing a plurality of storage signals corresponding to picture element signals for main scanning lines preceding the main scanning line whose picture element signals are currently being formed by said quantizing means;

output means coupled to said line memory for receiving from said line memory output signals corresponding to ones of the storage signals for positions of the picture elements currently being formed by said quantizing means;

comparator means, coupled to said quantizing means and said output means, for forming comparison signals representing a comparison of the picture element signals and the output signals;

first calculating means for adjusting values of the output signals toward a first level of the picture image characteristic thereby to produce adjusted picture element signals;

selection means, coupled to said first calculating means and said quantizing means and responsive to the comparison signals, for selecting the adjusted picture element signals as reference signals when the picture element signals have values closer to the first level than to values of the adjusted picture element signals, and otherwise for selecting the picture element signals as the reference signals;

writing means for writing the reference signals into said line memory; and second calculating means coupled to said selection means and said quantizing means for modifying the picture element signals toward the first level when the picture element signals have values closer to the first level than do said reference signals.

2. The system according to claim 1,
wherein said first level is a binary low level, and
wherein said first calculating means comprises attenuating means for attenuating the output signals received by said output means.

3. The system according to claim 2 wherein said attenuating means comprises a register preset with a value representing a desired amount of attenuation, and a subtractor circuit which subtracts said value preset in said register from values of the stored signals.

4. The system according to claim 3 wherein said subtractor circuit includes means for subtracting said value preset in said register for each of said main scanning lines.

5. The system according to claim 3,
wherein said attenuating means further comprises means for extracting said value preset in said register only during one of every first number of said main scanning lines, and
wherein said subtractor includes means for subtracting said value preset in said register only when said value present in said register is extracted by said extracting means.

6. The system according to claim 1 wherein the picture image characteristic represents blackness and wherein the first level represents the blackest value.

7. A system according to claim 2 wherein said second calculating means includes means for forming output picture element signals as the picture element signals if the picture element signals have values greater than or equal to the reference signals, and otherwise for forming the output picture element signals with values equal to two times the values of the picture element signals minus the values of said reference signals.

8. The system according to claim 7 wherein said second calculating means comprises a read only memory means containing prestored values for output picture element signals, said read only memory receiving picture element signals and said selection signals as addresses.

* * * * *